United States Patent [19]

Knight et al.

[11] Patent Number: 5,379,940
[45] Date of Patent: * Jan. 10, 1995

[54] SPREADER APPARATUS FOR SPREADING MANURE

[75] Inventors: Stanley W. Knight; William M. Saunders, both of Brodhead; Ric Joranlien, Monroe, all of Wis.

[73] Assignee: Knight Manufacturing Corp., Brodhead, Wis.

[ * ] Notice: The portion of the term of this patent subsequent to Jan. 4, 2011 has been disclaimed.

[21] Appl. No.: 154,581

[22] Filed: Nov. 18, 1993

Related U.S. Application Data

[63] Continuation of Ser. No. 56,568, May 3, 1993, Pat. No. 5,275,335, which is a continuation of Ser. No. 831,835, Feb. 6, 1992, abandoned.

[51] Int. Cl.$^6$ .............................................. A01C 15/00
[52] U.S. Cl. ................................... 239/675; 239/683; 366/297; 366/603
[58] Field of Search ........ 239/675, 683, 672, 679–681; 366/603, 297, 329, 300, 186

[56] References Cited

U.S. PATENT DOCUMENTS

| | | | |
|---|---|---|---|
| 3,037,780 | 6/1962 | Skronne et al. | 239/670 |
| 3,084,942 | 4/1963 | Kucera | 239/658 |
| 3,090,605 | 5/1963 | Copeland et al. | 366/298 |
| 3,155,288 | 11/1964 | Landgraf | 222/227 |
| 3,303,917 | 2/1967 | Wilkes et al. | 361/106 |
| 3,420,452 | 1/1969 | Vaughan | 239/670 |
| 3,478,970 | 11/1969 | Siwersson et al. | 239/687 |
| 3,706,442 | 12/1972 | Peat | 366/186 |
| 3,797,807 | 3/1974 | Behrens | 366/186 |
| 3,995,836 | 12/1976 | Carter et al. | 366/603 |
| 3,997,118 | 12/1976 | Bedwell et al. | 239/675 |
| 4,185,782 | 1/1980 | Belrose | 239/663 |
| 4,206,841 | 6/1980 | Lundgren | 198/670 |
| 4,362,272 | 12/1982 | Martin | 239/7 |
| 4,467,967 | 8/1984 | Martin | 239/662 |
| 4,473,184 | 9/1984 | Martin | 239/7 |
| 4,475,692 | 10/1984 | Walley | 239/662 |
| 4,480,927 | 11/1984 | Peat et al. | 366/603 |
| 4,528,098 | 7/1985 | Treysaac et al. | 210/414 |
| 4,720,047 | 1/1988 | Knight et al. | 239/675 |
| 4,752,139 | 6/1988 | Hauck | 366/300 |

FOREIGN PATENT DOCUMENTS

| | | | |
|---|---|---|---|
| 0061436 | 9/1982 | European Pat. Off. | 239/675 |
| 729227 | 11/1942 | Germany | 366/186 |
| 2028151 | 3/1980 | United Kingdom | 366/603 |
| 2030463 | 4/1980 | United Kingdom | 366/300 |

OTHER PUBLICATIONS

Slinger 700 Series Ref. 5204/201C/3P/1090, Pub. 1990, Knight Manufacturing Corp., Brodhead, Wis.
Slinger Sludge and Organic Waste Applicator, Ref. 5205/20KIP/0887, Pub. 1987, Knight Industrial Division, Brodhead, Wis.
Gehl Trade Publication No. 4424-286-107, Pub. 1986.
New Idea "Solids II Plus Spreaders", Form FH87-320, Pub. 1987.
H&S Trade Publication "U-Twin", Pub. 1988, Jul.
Rex Souper Spreader Trade Publication, Pub. 1984.
K&K "Big John" Trade Publication.

*Primary Examiner*—Karen B. Merritt
*Attorney, Agent, or Firm*—David J. Archer

[57] ABSTRACT

A spreader apparatus is disclosed for spreading manure. The apparatus includes a container which defines an opening for the reception therein of the manure. The container has a first and a second end zone with the first end zone defining an outlet for the discharge therethrough of the manure. A rotatable feed device is disposed within and co-operates with the container for feeding the manure through the container. The feed device has an axis of rotation which extends through the end zones of the container. A rotatable discharge device is disposed within the container and co-operates with the container and the feed device for moving the manure towards the outlet. The discharge device has a further axis of rotation which is disposed spaced and parallel to and laterally below the axis of rotation of the feed device. The arrangement is such that when the feed and discharge devices are rotating, all of the manure within the container is fed at a substantially constant rate towards the outlet.

9 Claims, 4 Drawing Sheets

SPREADER APPARATUS FOR SPREADING MANURE

CROSS REFERENCE TO RELATED APPLICATIONS

This application is a continuation of co-pending U.S. patent application Ser. No. 08/056,568 filed May 3, 1993, now U.S. Pat. No. 5,275,335, which is a file wrapper continuation of U.S. Ser. No. 07/831,835 filed Feb. 6, 1992 now abandoned. All the subject matter of the aforementioned Patent applications are incorporated herein by reference.

BACKGROUND OF THE INVENTION

1. Field of the Invention

The present invention relates to a spreader apparatus for spreading manure. More particularly, the present invention relates to a spreader apparatus for spreading manure over a field to be used for agricultural purposes.

2. Information Disclosure Statement

Many farms include provisions for both the cultivation of arable farm land and the housing of livestock such as cows, beef cattle, chickens etc.

Typically, the manure from the livestock is collected as a useful source of natural fertilizer. Such manure is subsequently distributed on the land, thereby increasing the yield of the crops cultivated thereon.

Many mechanical arrangements have been devised for spreading such manure onto the surface of a field to be cultivated. Usually, such apparatus includes a cart having a container thereon with a conveyer for conveying the manure towards a spreader paddle which distributes the manure from the cart as the cart is drawn by a tractor.

More recently, as taught in U.S. Pat. No. 4479608 to Martin, a wheeled container includes a rotatable auger disposed adjacent to the base of a V-shaped container. The arrangement is such that the manure within the container is moved by the auger towards the end of the container where a paddle extending from the shaft of the auger projects the manure laterally through a discharge outlet defined by the container. The arrangement is such that the manure is distributed over the field by the tractor drawn container.

The aforementioned spreader apparatus also typically includes an auxiliary shaft disposed adjacent to the discharge outlet. Such auxiliary shaft has a plurality of radially extending hammer elements which rotate at a relatively high rotational speed for shredding and disintegrating the manure as the manure is discharged through the outlet.

In the aforementioned arrangement, there exist a tendency for the manure, particularly when in a semi-solid and/or fibrous state, to become bridged over the discharge auger. Such bridging is caused primarily because the side walls of the container must of necessity converge in a downward direction towards the discharge auger so that the manure is fed by gravity to the auger. If the side walls were disposed substantially parallel to each other, the capacity of the container would be severely limited. A typical container of the aforementioned type has a capacity of approximately ten cubic yards. Consequently, the angle defined between each side wall and the vertical is approximately 35 degrees. Accordingly, the angle defined between the side walls of a single auger spreader is in the region of seventy degrees so that bridging of the auger by the manure becomes a substantial problem.

In practice, in the design of spreaders, such spreaders have been made as large as possible so that frequent refilling of the spreader is avoided. However, in order to provide such increased capacity, the angle between the side walls must be increased and this leads to the aforementioned problem of bridging.

When the manure bridges over the auger within the container, no manure is fed by the auger towards the discharge outlet. Therefore, it is necessary for the operator to manually break the bridge before continuing the distribution cycle. Not only is the aforementioned problem inconvenient and time consuming, but also such delays caused by bridging generate an uneven distribution of the manure over the field which subsequently results in uneven crop growth.

The present invention overcomes the aforementioned problem by the provision of two augers disposed adjacent to the base of a container so that the side walls of the container provide a much steeper slope so that the manure under the influence of gravity is freely fed towards the augers thereby inhibiting the aforementioned manure bridging problem.

Also, even without the provision of the aforementioned much steeper slope, the provision of two augers according to the present invention inhibits the problem of bridging as the walls are further apart.

Additionally, the present invention provides a spreader apparatus having a feed auger and a discharge auger, with the axis of rotation of the discharge auger being disposed spaced and parallel to and laterally below the rotational axis of the feed auger. The arrangement is such that when the majority of the manure has been discharged from the container, the remaining manure within the container is fed directly and radially relative to the feed auger into mesh with the lower discharge auger so that the rate of discharge of the manure through the outlet remains relatively constant throughout the discharge of the entire load from the container.

Such constant discharge results in an even manure spread pattern. Also, the operator spends less time spreading a load of manure because the speed at which unloading is accomplished is increased due to the absence of bridging and no slowing down of the discharge rate towards the end of the spreading cycle.

An objective of the present invention is the provision of a spreader apparatus for spreading manure which includes a feed auger and a discharge auger. The axis of rotation of the discharge auger is spaced and parallel to and disposed laterally below the rotational axis of the feed auger so that discharge of manure from the outlet remains substantially constant during discharge of an entire load from the spreader apparatus.

Another object of the present invention is the provision of a spreader apparatus for spreading manure in which the problem of bridging over the auger within the container is overcome by the provision of a feed and a discharge auger.

Other objects and advantages of the present invention will become readily apparent to those skilled in the art by a consideration of the detailed description contained hereinafter taken in conjunction with the annexed drawings.

SUMMARY OF THE INVENTION

The present invention relates to a spreader apparatus and method for spreading manure. The apparatus includes a container which defines an opening for the reception therein of the manure. The container has a first and a second end zone with the first end zone defining an outlet for the discharge therethrough of the manure.

A rotatable feed means is disposed within and cooperates with the container for feeding the manure through the container. The feed means has an axis of rotation which extends through the end zones of the container.

A rotatable discharge means is disposed within the container and co-operates with the container and the feed means for moving the manure towards the outlet. The discharge means has a further axis of rotation which is disposed, spaced and parallel to and laterally below the axis of rotation of the feed means. The arrangement is such that when the feed and discharge means are rotating, all of the manure within the container is fed at a substantially constant rate towards the outlet.

The apparatus of the present invention may also be used for spreading materials other than manure such as sewage sludge and lime sludge and other types of fertilizers.

BRIEF DESCRIPTION OF THE DRAWINGS

Similar reference characters refer to similar parts throughout the various embodiments of the present invention.

DETAILED DESCRIPTION OF THE DRAWINGS

Figure 1:
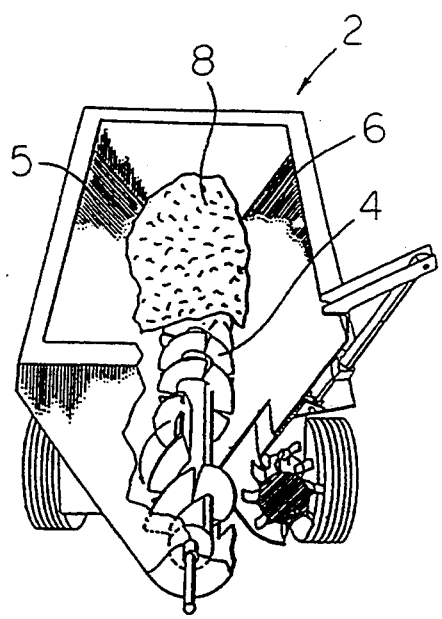
FIG. 1 is a perspective view of a prior art spreader apparatus showing the problem of bridging.

FIG. 1 is a perspective view of a prior art spreader apparatus generally designated 2 for spreading manure. The spreader 2 includes a single auger 4 and side walls 5 and 6 which cause bridging of the manure as shown at 8.

Figure 2:
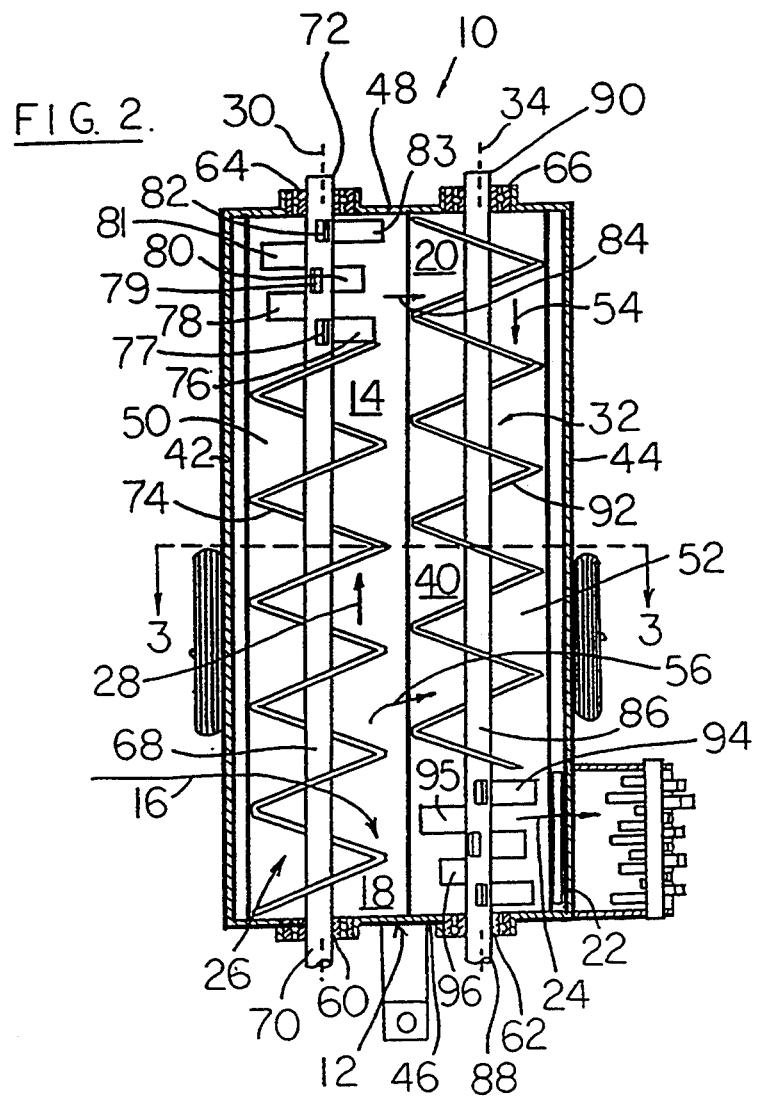
FIG. 2 is a top plan view of a spreader apparatus according to the present invention.

The spreader apparatus of the present invention as shown in FIG. 2 overcomes the bridging problem and provides an even distribution of the manure load therefrom.

Figure 3:
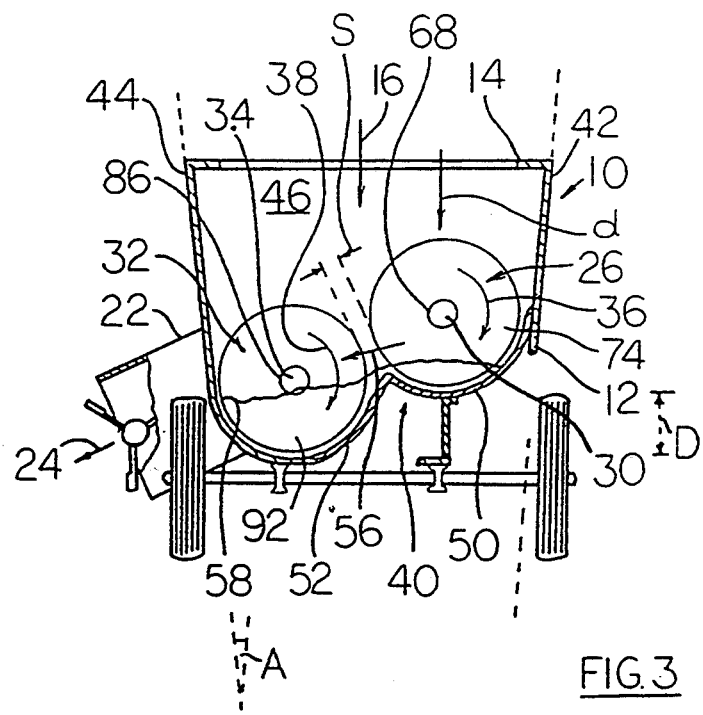
FIG. 3 is a sectional view taken on the line 3—3 of FIG. 2.

FIG. 2 is a top plan view of a spreader apparatus generally designated 10 according to the present invention. Additionally, FIG. 3 is a sectional view taken on the line 3—3 of FIG. 2. The apparatus 10 includes a container generally designated 12 which defines an opening 14, shown in FIG. 3, for the reception therein of manure as indicated by the arrow 16.

The container 12 has a first and a second end zone 18 and 20 respectively. The first end zone 18 defines an outlet 22 for the discharge therethrough of manure as indicated by the arrow 24.

A rotatable feed auger generally designated 26 is disposed within and co-operates with the container 12 for feeding the manure as indicated by the arrow 28 through the container 12. The feed auger 26 has an axis of rotation 30 which extends through the end zones 18 and 20 respectively of the container 12.

A rotatable discharge auger generally designated 32 is disposed within the container 12 and co-operates with the container 12 and the feed auger 26 for moving the manure 16 towards the outlet 22. The discharge auger 32 has a further axis of rotation 34 which is disposed spaced and parallel to and laterally below the axis of rotation 30 of the feed auger 26 as shown in FIG. 3. The arrangement is such that when the augers 26 and 32 respectively are rotating, as indicated by the arrows 36 and 38, all of the manure 16 within the container 12 is fed at a substantially constant rate towards the outlet 22.

As shown in FIG. 2, the container 12 further includes a base generally designated 40 which extends between the end zones 18 and 20.

FIG. 3 shows the first and second side walls 42 and 44 respectively separated from each other by the base 40. The side walls 42 and 44 extend between the end zones 18 and 20.

As shown in FIG. 2, the first and second end walls 46 and 48 are secured to the side walls 42 and 44 and to the base 40. The first and second end walls 46 and 48 respectively are disposed within the first and second end zones 18 and 20 respectively. The arrangement is such that the base 40, the side walls 42 and 44 and the end walls 46 and 48 co-operate together to contain the manure 16.

As shown particularly in FIG. 3, the base 40 also includes a first portion 50 which co-operates with the feed auger 26 such that when the feed auger 26 is rotating as indicated by the arrow 36, the manure 16 is fed through the container 12 partially due to an interaction between the feed auger 26 and the first portion 50.

A second portion 52 of the base 40 is disposed at a lower elevation relative to the first portion 50. The second portion 52 co-operates with the discharge auger 32 such that when the discharge auger 32 is rotating as indicated by the arrow 38, the manure 16 is moved towards the outlet 22, as indicated by the arrow 54 shown in FIG. 2. Such movement is at least partially due to an interaction of the discharge auger 32 and the second portion 52.

More specifically, as shown in FIG. 3, the first portion 50 and the further axis of rotation 34 of the discharge auger 32 are disposed at substantially the same elevation such that when the feed auger 26 is rotating as indicated by the arrow 36, the manure 16 is fed directly by the feed auger 26 to the discharge auger 32 as indicated by the arrow 56 without the manure 16 having to travel to the second end zone 20. The first portion 50 guides the manure 16 directly as indicated by the arrow 56 from the feed auger 26 into mesh with the discharge auger 32 particularly when the amount of manure within the container 12 is minimal as indicated at 58. The arrangement is such that when the majority of the manure within the container 12 has been discharged and the minimal amount 58 remains within the container, such minimal amount 58 is discharged at substantially the same rate as the rate of discharge of the majority.

The first portion 50 is disposed at an elevational distance D from the second portion. The distance D is at least ⅓rd of the diameter of the discharge auger.

The side walls 42 and 44 each define therebetween an angle A within the range from 1 to 60 degrees so that the side walls 42 and 44 converge towards each other in a direction from the opening 14 towards the base 40 such that the manure 16 is assisted under the influence of gravity to move in the direction as indicated by the arrow d from the opening 14 towards the augers 26 and 32.

The second side wall 44 as shown in FIG. 2, defines the outlet 22.

Each of the end walls 46 and 48 respectively define apertures 60,62,64 and 66 respectively for the rotatable reception therein of the augers 26 and 32 such that the augers 26 and 32 are rotatably supported by the end walls 46 and 48.

The feed auger 26 includes a longitudinal shaft 68 which has a first and a second end 70 and 72 respectively. The first end 70 is rotatably supported adjacent to the first end zone 18. The second end 72 is rotatably supported adjacent to the second end zone 20.

A helical flight 74 is secured along the length thereof to the shaft 68 such that as the shaft 68 is rotated as indicated by the arrow 36, the manure 16 within the container 12 and disposed adjacent to the flight 74 is urged by the flight 74 in a first direction as indicated by the arrow 28 from the first end 70 towards the second end 72 of the shaft 68.

Additionally, the manure 16 is also moved in a second direction radially away from the shaft 68 as indicated by the arrow 56. Such movement in the second direction 56 increases particularly, when a majority of the manure 16 within the container 12 has been discharged as shown at 58 so that a minimal amount 58 of the manure 16 remaining in the container 12 moves radially away from the shaft 68 into mesh with the discharge auger 32 as shown by the arrow 56 rather than traversing the container 12 towards the second end zone 20 thereof before being urged into mesh with the discharge auger 32.

The feed auger 26 has a diameter within the range 15 to 30 inches and the augers 26 and 32 are separated from each other by a distance S shown in FIG. 2 within the range 0 to 6 inches.

Furthermore, the feed auger 26 also includes a plurality of paddles 76,77,78,79,80,81,82 and 83 which extend radially from and are staggered circumferentially around the second end 72 of the shaft 68. The arrangement is such that when the shaft 68 is rotating as indicated by the arrow 36, manure in the vicinity of the paddles 76–83 is urged away from the second end 72 of the shaft 68 towards the discharge auger 32 as indicated by the arrow 84.

The discharge auger 32 also includes a further shaft 86 having a first and second extremity 88 and 90 respectively, which are disposed adjacent to the first and second end zones 18 and 20 respectively.

A further helical flight 92 is secured along the length thereof to the further shaft 86 such that when the further shaft 86 is rotating as indicated by the arrow 38, the manure 16 is moved by the further flight 86 from the second extremity 90 towards the the first extremity 88 of the further shaft 86 towards the outlet 22.

The discharge auger 32 also includes a plurality of further paddles 94,95, and 96 as shown in FIG. 2 which extend substantially radially from and are staggered circumferentially around the first end 88 of the further shaft 86. The arrangement is such that when the further shaft 86 is rotating as indicated by the arrow 38, the manure 16 is discharged by the further paddles 94–96 through the outlet 22.

The discharge auger 32 has a diameter within the range 15 to 30 inches.

Figure 3A:
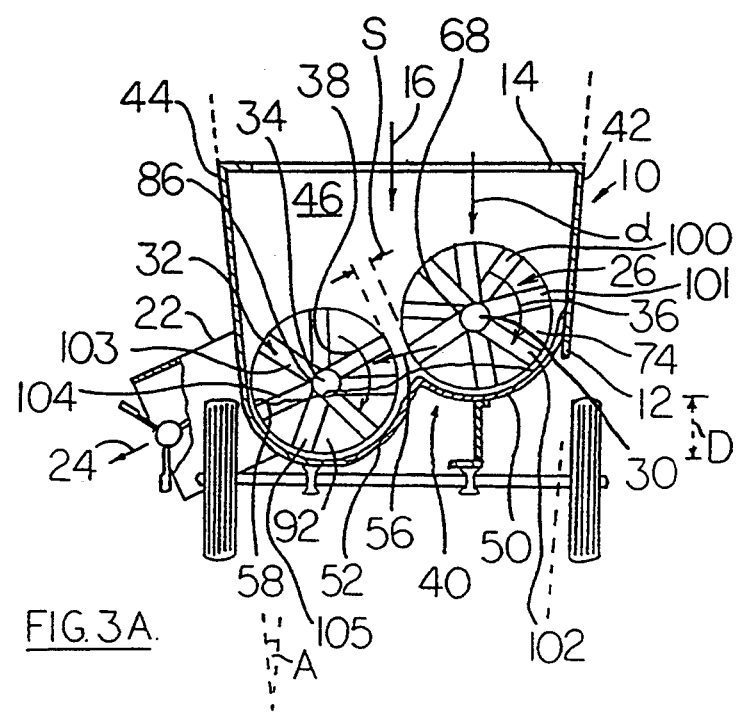
FIG. 3A is a similar view to that shown in FIG. 3 but shows an alternative embodiment of the present invention in which a plurality of vanes extend respectively from the feed and discharge shafts.

FIG. 3A is a similar view to that shown in FIG. 3 but shows an alternative embodiment of the present invention in which the helical flight 74 is replaced by a plurality of generally radially extending vanes 100, 101 and 102 extending from the shaft 68.

Also, the discharge shaft 86 is provided with radial vanes 103, 104 and 105 in place of the further helical flight 92.

In the operation of the apparatus according to the present invention, during rotation of the feed auger, the manure is fed in a first direction 28 substantially parallel to the axis of rotation 30 of the feed auger. However, the feed auger also imparts a substantially radial component to the manure as indicated by the arrow 56. The arrangement is such that any voids in the manure flowing in the direction 54 towards the outlet are automatically filled by such radial flow component. It will be appreciated by those skilled in the art that in practice, the manure will have various flow vectors dependent upon the existence of voids within the flow 54 and the speed of rotation of the feed auger and the consistency of the manure.

Nevertheless, the present arrangement is particularly advantageous in dispensing the remainder of the manure from the container because during discharge of such residue, the manure moved by the discharge auger will include voids which will be readily filled by such radial flow thus avoiding the time needed for such manure having to flow to the second end of the feed auger and back by means of the discharge auger.

Therefore, the actual flow of manure is a vector of the first and second directions but if no voids exist, such flow will be primarily axially along the feed auger.

The aforementioned radial flow of manure from the feed auger is primarily due to the absence of any containment of the manure at the termination of the first portion 50, that is the juncture of 50 and 52.

Although the height of the portion 50 above 52 can be provided according to the type of manure being spread, Applicants have discovered that 50 should be at a height equivalent to at least ⅓rd of the diameter of the discharge auger.

The arrangement in which vanes are used instead of helical flights operates in substantially the same manner as that when augers are used.

Figure 4:
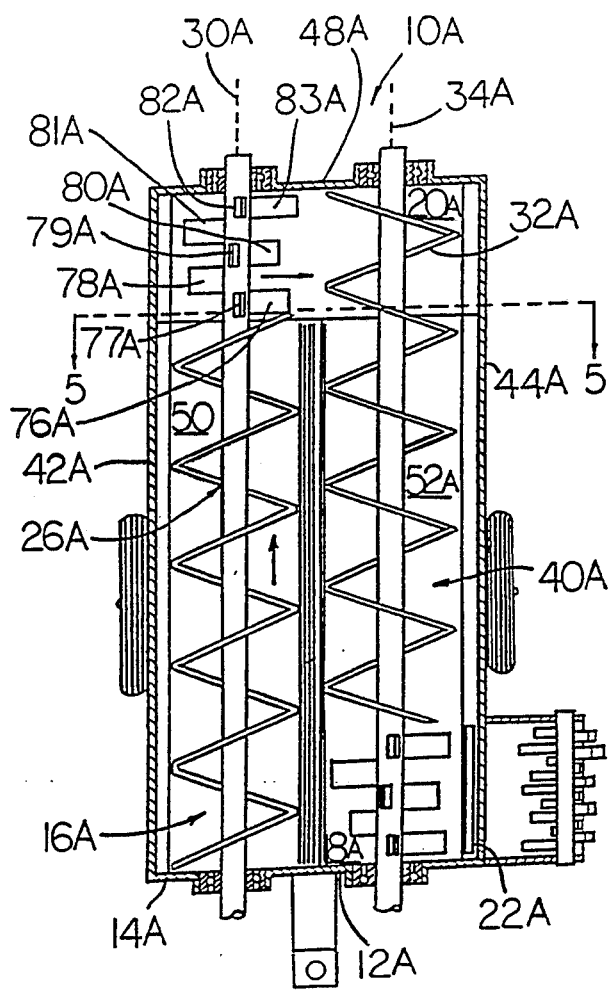
FIG. 4 is a view similar to that shown in FIG. 2 but shows an alternative embodiment of the present invention.

FIG. 4 is a plan view similar to that shown in FIG. 2 but shows a further embodiment of the present invention in which a spreader apparatus generally designated 10a for spreading manure 16a includes a container 12a defining an opening 14a for the reception therein of the manure 16a. The container 12a has a first and a second end zone 18a and 20a respectively. The first end zone 18a defines an outlet 22a for the discharge therethrough of the manure 16a.

Figures 5, 5A:
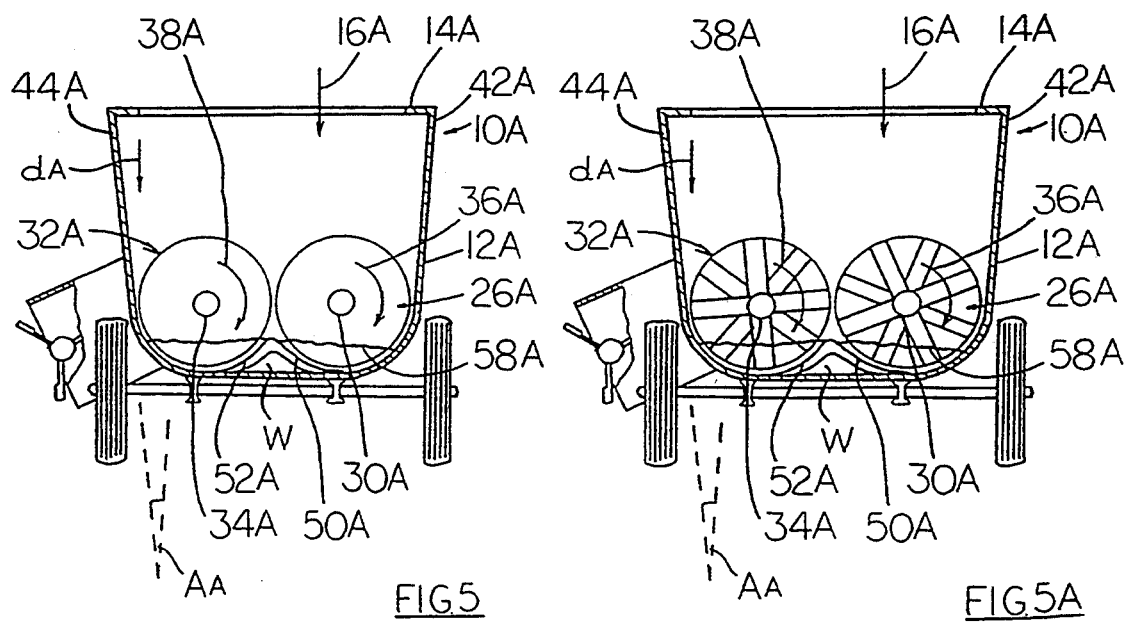
FIG. 5 is a sectional view taken on the line 5—5 shown in FIG. 4.
FIG. 5A is a similar view to that shown in FIG. 5 but shows an alternative arrangement in which vanes replace the helical flights of the feed and discharge means.

FIG. 5 is a sectional view taken on the line 5—5 of FIG. 4. As shown in FIGS. 4 and 5, the container 12a includes a first and second side wall 42a and 44a which extend between the end zones 18a and 20a. The side walls 42a and 44a define therebetween an angle Aa within the range 1 to 60 degrees such that the manure 16a within the container 12a is guided downwardly as indicated by the arrow da by the side walls 42a and 44a so that bridging of the manure within the container 12a is inhibited.

A rotatable feed auger generally designated 26a is disposed within and co-operates with the container 12a for feeding the manure 16a through the container 12a. The feed auger 26a has an axis of rotation 30a which extends through the end zones 18a and 20a of the container 12a.

A rotatable discharge auger generally designated 32a is disposed within the container 12a and co-operates with the container 12a and the feed auger 26a for moving the manure 16a towards the outlet 22a. The discharge auger 32a has a further axis of rotation 34a which is disposed spaced and parallel to and laterally relative to the axis of rotation 30a of the feed auger 26a. The arrangement is such that when the augers 26a and 32a respectively are rotating as indicated by the arrows 36a and 38a, the manure 16a is fed by the feed auger 26a towards the discharge auger 32a so that the discharge auger 32a discharges the manure through the outlet 22a.

Although, according to the present invention the provision of a feed and a discharge auger inhibits the problem of bridging due to the provision of more vertically disposed side walls, there exists a tendency in the case of the embodiment shown in FIGS. 4 and 5 for the manure to be discharged at a relatively constant rate until the manure drops to a level of the axes of rotation 30a and 34a of the feed and discharge augers.

At that point, the manure supported by a first portion 50a of the base 40a must be fed along such first portion 50a towards the second end wall 48a where no partition exists between the first and second portions 50a and 52a of the base 40a. At such point the paddles 76a–83a urge the manure radially and tangentially towards the discharge auger 32a so that the remainder of the manure is discharged from the container 12a.

Therefore, the rate of discharge of the remaining portion 58a within the container 12a is discharged at a slower rate than the discharge of the earlier load. The arrangement is such that there exists a fairly constant rate of discharge of the manure until the level drops and the remainder 58a of the manure tends to dribble out relatively slowly from the discharge outlet 22a.

Furthermore, because of the absence of a partition between the first and second portions 50a and 52a of the base 40a adjacent to the second end wall 48a, there exists a tendency for a triangular wedge W of manure to become lodged at this location which is free from the sweeping action of either the paddles 76a–83a or the rotating discharge auger 32a.

In operation of the embodiment shown in FIGS. 4 and 5, the capacity of the container is increased when compared with the prior art single auger arrangements. Also, by the provision of two augers, the base is wider and the side walls can define therebetween a lesser angle which lessens the problem of bridging.

Figure 6:
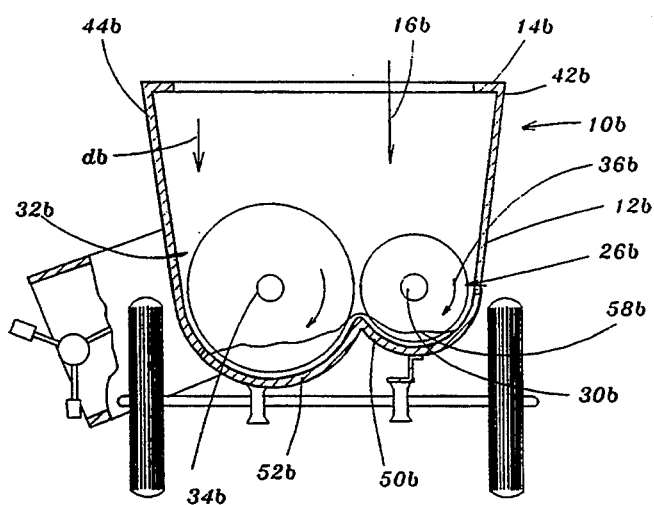
FIG. 6 is a similar view to that shown in FIG. 5 but shows an alternative arrangement of the present invention.

FIG. 6 is a side elevational view of a spreader apparatus 10b in which the axis of rotation 30b of the feed auger and the further axis of rotation 34b of the discharge auger are at the same elevation but the feed and discharge augers have different diameters.

Although it is known in the prior art to provide two augers, Applicants are unaware of any arrangement in which the augers feed the manure in opposite directions as is the case in the present invention.

Those skilled in the art will appreciate that in all of the embodiments of the present invention, the respective directions of rotation of either shaft can be changed independently providing the sense of the flight or vanes is altered accordingly. Noting vanes and flights can be interchanged independently on each auger also.

Additionally, although the apparatus is shown including tires and a towing tongue, the present invention is equally applicable to an apparatus mounted on a truck chassis or the like.

Accordingly, Applicants discovered that by the provision of the feed auger and particularly the higher elevation thereof there existed a tendency for the manure to move radially away from the feed auger directly into mesh with the discharge auger, such radial feeding being also assisted by gravity. Therefore, particularly towards the discharge of the remaining amount within the container, such manure moves radially into mesh with the discharge auger without such manure having to be moved all the way along the first portion of the base towards the crossover point adjacent the second end zone of the container.

Consequently, the present invention provides a more even and constant rate of flow of the manure from the feed to the discharge auger so that such manure is evenly distributed through the outlet.

The present invention also provides a spreader apparatus which enables the side walls thereof to be closer to the vertical thereby inhibiting any tendency for the manure to bridge within the container. The present invention also provides means for discharging the manure from the container at a relatively constant rate for the entire load within the container.

What is claimed is:

1. A spreader apparatus for spreading manure, said apparatus comprising:
    a container defining an opening for the reception therein of the manure, said container also defining an outlet for the discharge therethrough of the manure;
    a rotatable feed means disposed within and co-operating with said container for feeding the manure through said container, said feed means having an axis of rotation extending through said container;
    a rotatable discharge means disposed within said container and co-operating with said container and said feed means for moving the manure towards said outlet, said discharge means having a further axis of rotation extending through said container, said further axis of rotation being disposed spaced and parallel relative to said axis of rotation of said feed means;
    said container further including:
    a base;
    said base including:
    a first portion which co-operates with said feed means; and
    a second portion which co-operates with said discharge means, said second portion being disposed at a lower elevation relative to said first portion, the arrangement being such that when said feed means and said discharge means are rotating and when a residue of the manure is disposed adjacent to said first portion, rotation of said feed and discharge means moves said residue in a direction from said first portion immediately towards said second portion, the manure being fed by said feed means from said feed means to said discharge means even when the level of the manure drops below the top of said discharge means so that all of the manure within said container is fed at a substantially constant rate towards said outlet.

2. A spreader apparatus as set forth in claim 1 wherein said further axis of rotation is disposed below said axis of rotation of said feed means.

3. A spreader apparatus as set forth in claim 1 wherein said further axis of rotation is disposed at the same elevation as said axis of rotation of said feed means.

4. A spreader apparatus as set forth in claim 1 wherein said first portion is disposed within a range 5 to 14 inches higher than said second portion.

5. A spreader apparatus as set forth in claim 4 wherein said feed means and said discharge means have diameters which are respectively within a range 15 to 30 inches.

6. A spreader apparatus as set forth in claim 1 wherein said feed means and said discharge means are separated from each other.

7. A spreader apparatus for spreading manure, said apparatus comprising:
a container defining an opening for the reception therein of the manure, said container also defining an outlet for the discharge therethrough of the manure;
a rotatable feed means disposed within and co-operating with said container for feeding the manure through said container, said feed means having an axis of rotation extending through said container;
a rotatable discharge means disposed within said container and co-operating with said container and said feed means for moving the manure towards said outlet, said discharge means having a further axis of rotation extending through said container, said further axis of rotation being disposed spaced and parallel relative to said axis of rotation of said feed means;
said container further including:
a base;
said base including:
a first portion which co-operates with said feed means; and
a second portion which co-operates with said discharge means, said second portion being disposed at a lower elevation relative to said first portion, the arrangement being such that when said feed means and said discharge means are rotating and when a residue of the manure is disposed adjacent to said first portion, rotation of said feed and discharge means moves said residue in a direction from said first portion immediately towards said second portion, the manure being fed by said feed means from said feed means to said discharge means even when the level of the manure drops below the top of said discharge means so that all of the manure within said container is fed at a substantially constant rate towards said outlet, the manure being fed through said container partially due to an interaction between said feed means and said first portion, the manure also being moved towards said outlet partially due to an interaction of said discharge means and said second portion.

8. A spreader apparatus for spreading manure, said apparatus comprising:
a container defining an opening for the reception therein of the manure, said container also defining an outlet for the discharge therethrough of the manure;
a rotatable feed means disposed within and co-operating with said container for feeding the manure through said container, said feed means having an axis of rotation extending through said container;
a rotatable discharge means disposed within said container and co-operating with said container and said feed means for moving the manure towards said outlet, said discharge means having a further axis of rotation extending through said container, said further axis of rotation being disposed spaced and parallel relative to said axis of rotation of said feed means;
said container further including:
a base;
said base including:
a first portion which co-operates with said feed means; and
a second portion which co-operates with said discharge means, said second portion being disposed at a lower elevation relative to said first portion, the arrangement being such that when said feed means and said discharge means are rotating and when a residue of the manure is disposed adjacent to said first portion, rotation of said feed and discharge means moves said residue in a direction from said first portion immediately towards said second portion, the manure being fed by said feed means from said feed means to said discharge means even when the level of the manure drops below the top of said discharge means so that all of the manure within said container is fed at a substantially constant rate towards said outlet, the manure being fed by said feed means in a first direction parallel to said axis of rotation and in a second direction radially away from said feed means, such movement in said second direction increasing particularly when a major portion of the manure within said container has been discharged so that the manure remaining in said container moves radially away from said feed means into mesh with said discharge means rather than traversing said container in said first direction.

9. A spreader apparatus for spreading manure, said apparatus comprising:
a container defining an opening for the reception therein of the manure, said container also defining an outlet for the discharge therethrough of the manure;
a rotatable feed means disposed within and co-operating with said container for feeding the manure through said container, said feed means having an axis of rotation extending through said container;
a rotatable discharge means disposed within said container and co-operating with said container and said feed means for moving the manure towards said outlet, said discharge means having a further axis of rotation extending through said container, said further axis of rotation being disposed spaced and parallel relative to said axis of rotation of said feed means;
said container further including:
a base;

said base including:

a first portion which co-operates with said feed means; and a second portion which co-operates with said discharge means, said second portion being disposed at a lower elevation relative to said first portion, the arrangement being such that when said feed means and said discharge means are rotating and when a residue of the manure is disposed adjacent to said first portion, rotation of said feed and discharge means moves said residue in a direction from said first portion immediately towards said second portion, the manure being fed by said feed means from said feed means to said discharge means even when the level of the manure drops below the top of said discharge means so that all of the manure within said container is fed at a substantially constant rate towards said outlet, the manure being fed in a first direction substantially parallel to said axis of rotation of said feed means, however, said feed means also imparting a substantially radial component to the manure such that any voids in the manure being moved by said discharge means towards said outlet are automatically filled by such radial flow component particularly when said residue of the manure remains in said container, thereby avoiding the time needed for such manure to flow in said first direction along said first portion and back by means of said discharge means along said second portion.

* * * * *